United States Patent Office 3,356,890
Patented Dec. 5, 1967

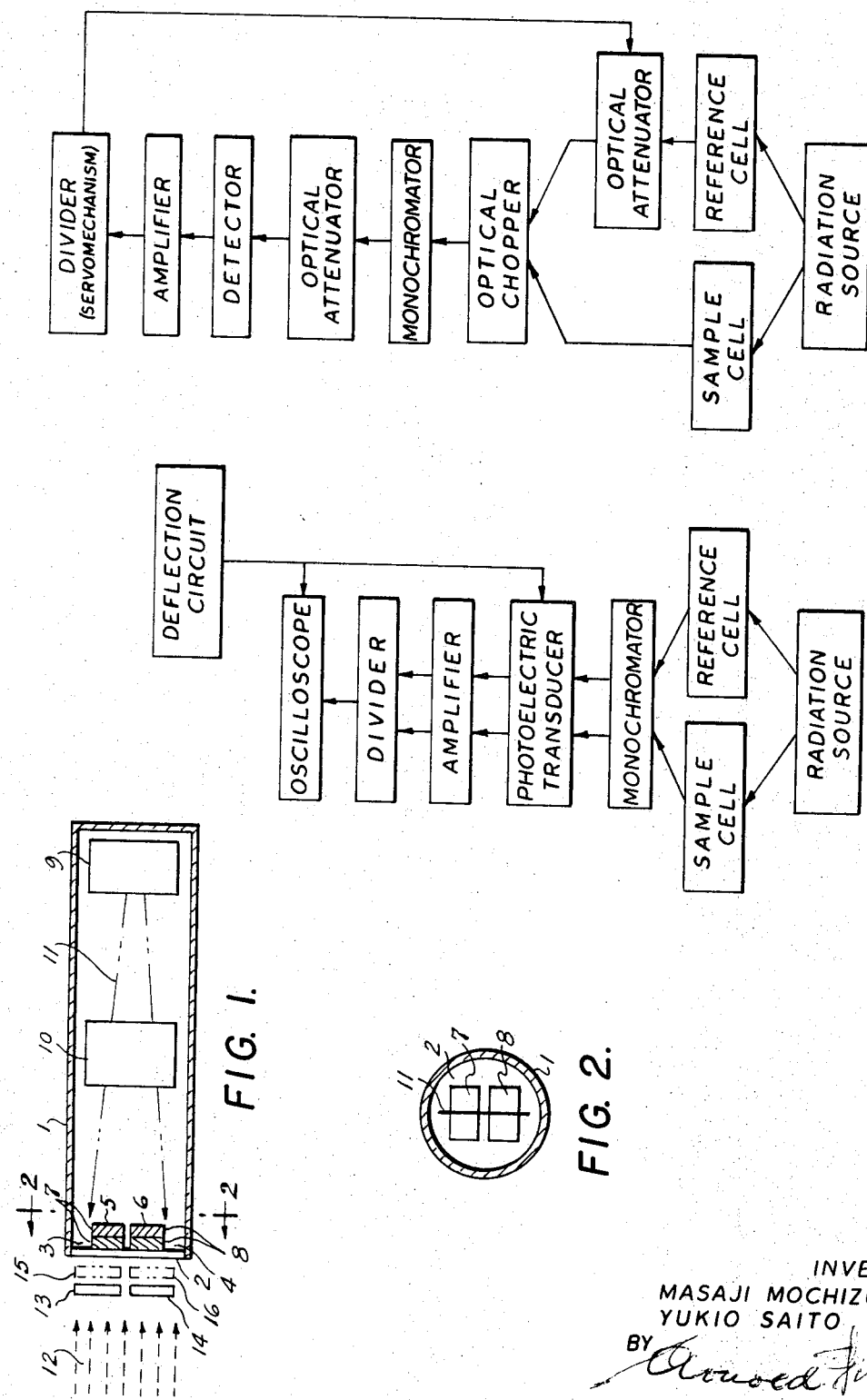

3,356,890
SIMULTANEOUS SCAN OF TWO PHOTOCONDUC-
TIVE TARGETS WITH FLAT BEAM
Masaji Mochizuki, Sapporo, Hokkaido, and Yukio Saito, Warabi, Saitama, Japan, assignors to Sankyo Company Ltd., Toyko, Japan, a corporation of Japan
Filed July 7, 1964, Ser. No. 380,831
Claims priority, application Japan, July 10, 1963, 38/36,558
2 Claims. (Cl. 315—21)

This invention relates to an improvement in the photoelectric transducer useful in a spectrophotometer.

In the accompanying drawing, FIGURE 1 is the side elevation of a photoelectric transducer of the present invention, which is partly shown in cross section; FIGURE 2 is the cross-sectional view of the said photoelectric transducer taken along the line A–A' on FIG. 1; FIGURE 3 is the block diagram of a spectrophotometer according to the present invention; and FIGURE 4 is that of a spectrophotometer conventionally known in the art.

The operation of the photoelectric transducer of the invention will be explained as follows: Radiation which passes through a sample cell and that which passes through a reference cell are directed respectively to two optically transparent signal plates, which are placed in a vacuum vessel, so as to form an image on the said plates. The signal plates are superposed with the thin layer of a photoconductive material on their reverse side, and the electric resistance of the photoconductive layer will vary in response to formation of the optical image thereon. On the other hand, fan electron beam is directed to the signal plates in such a manner that it sweeps the photoconductive layer on the two signal plates simultaneously, whereby the magnitude of neutralizing current at the maximum resistance and minimum resistance of the photoconductive layers is taken up as signal from the signal plates. The novel feature of a photoelectric transducer of the present invention is that all the functions can be performed electronically.

In spectrophotometry, the transmittance T can be determined according to the following equation:

$$T = I_S / I_R$$

wherein $I_S$ refers to the intensity of ray transmitted through a sample cell and $I_R$ refers to the intensity of ray transmitted through a reference cell. In the conventionally known spectrophotometer, a servomechanism is used to determine the value T. As illustrated on FIG. 4, in a conventional spectrophotometer, the ray from a radiation source is divided into two portions, one of which is passed through a sample cell and the other through a reference cell and an optical attenuator. Both portions are alternately passed to a monochromator by means of an optical chopper. The resulting monochromatic ray is passed through an optical attenuator to a detector in which photoelectric conversion is effected. Thus, the ray transmitted through the sample and reference cells is converted into an electric signal which is then amplified by means of an amplifier and detector. The output signals are controlled by means of a divider servomechanism with the control action of the optical attenuator from the reference cell, so that the ray coming from the sample cell and that coming from the referenec cell are equilibrated automatically. Where the intensity of the ray attenuated by the attenuator is kept in linear relation to the mechanical position of the attenuator, such position will indicate the transmittance of the sample. Accordingly, if a recording stylus is connected to the attenuator so as to be displaced in accordance with the position thereof, it is possible to effect continuous recording of the transmittance of the sample at any wave length. Thus, the transmittance can be automatically obtained by means of a servomechanism, but it is necessary to effect programming or automatic control by using another attenuator so as to have the intensity of ray constant at any wave length in order to have constant loop gain in a division system.

Because of its employment of a servomechanism, the conventionally known spectroscopic photometer requires a few minutes or more for a single measurement. Rapid change in transmittance can be traced only by increasing the response velocity of the servomechanism. Practically, however, it is difficult to increase the said velocity so high because of the mechanical performance of the spectrophotometer. In an attempt to improve the inconvenience, there is proposed a device wherein a monochromator only is operated mechanically and all other parts are operated electronically, but this is still unsatisfactory.

The present invention can overcome all the disadvantages encountered in the prior art and permits perfect electronic operation of a photo-electric transducer. Now the present invention will be explained in detail with reference to the attached drawings:

In FIGURES 1 and 2, the numeral 1 indicates a vacuum vessel, at one end of which there is provided a light-inlet window 2 made of optically plane glass. Inside and near the window, two signal plates 3 and 4 are placed, and such original plates are connected respectively to outer terminals. On the signal plates 3 and 4, the thin layers 5 and 6 of a photoconductive material are superposed respectively. The signal plates 3 and 4, together with the said layers 5 and 6 respectively, form two photoelectric transducing means 7 and 8. At the other end of the vacuum vessel, there is provided a fan electron beam-generator 9. The electron beam 11 from generator 9 is slit-like in cross-section and impinges against the photo-electric transducing means 7 and 8. Deflection of the fan electron beam is effected only laterally by means of a deflection circuit 10 placed between the fan electron beam generator 9 and the photoelectric transducing means 7, 8. In the drawing, the incident rays are identified as 12, sample cell as 13, reference cell as 14, and monochromators as 15 and 16.

With no incident radiation 12, the photoconductive layers 5, 6 are swept by fan electron beam 11 by the action of the deflection circuit 10, whereby the surfaces of said layers on the beam side will be in equilibrium with a cathodic potential. The reason for this is that since the layers 5, 6 which have no incident radiation impinging thereon are of extremely high resistance, positive potential impressed on the signal plates 3, 4 does not appear on the surface of said layers. Upon the projection of incident radiation on the layers 5, 6, the internal resistance of the layers is decreased in proportion to the amount of incident radiation. When the layers 5, 6 having decreased internal resistance, and thus being electroconductive are swept by fan electron beam, a part of the positive potential impressed on the signal plates 3, 4 is shifted toward the beam side. While the beam side on which positive charge appears is swept by the electron beam, neutralization of the positive charge by the electrons occurs, until it leaves the original cathodic potential. Discharge current results in an electric discharge on the signal plates 3, 4 according to the time constant defined by the capacity and resistance of the layers 5, 6, whereby a signal current in proportion to the incident radiation is generated.

The incident radiation passed through a sample cell 13 and a monochromator 15 is directed to signal plate 3 thereby to form thereon an image of a spectrum in the band form of a band at right angles to the direction of the longitudinal axis of the slit-like cross-section of the fan shaped electron beam, and similarly, incident radiation passed through a reference cell 14 and then through a monochromator 16 is directed to the other signal plate 4 to form an image of a spectrum thereon. Alignment of both the signal plates is adjusted to be in order in accordance with wave length. If layers 5 and 6 are swept by the fan electron beam at this stage, the electric signal of the spectrum of radiation passing through the sample cell 13 and that of the spectrum of radiation passing through the reference cell are obtained simultaneously from the signal plates 3 and 4, respectively, on every sweep. Two signals are fed into a high speed divider circuit thereby to obtain the transmittance of a sample.

Although the signal plates 3 and 4 are placed end to end in the above-described embodiment of the present invention, they may be placed in any other relative positions. The thin layers 5, 6 of a photoconductive material may be in separate portions or in a single form. It is also possible to independently sweep the surface of the signal plates 3, 4 by using a fan electron beam-generating source 9. Collimation and deflection of the fan electron beam 11 can be effected either electrostatically or electromagnetically.

Suitable as photoconductive materials are antimony trisulfide, amorphous selenium, germanium monosulfide or any other material the electro-conductivity of which varies in response to radiation. An optically transparent electro-conductive film, e.g. Nesa, is suitable as a material for the signal plates 3 and 4.

FIGURE 3 is the scheme showing application of the present invention in a spectrophotometer. Radiation emitted from a radiation source is passed through a sample cell or a reference cell and then through a monochromator and then forms the image on a photoelectric transducer. The resulting electric signals, one of which comes from the sample cell and the other of which comes from the reference cell, are individually amplified in the amplifier while effecting gamma-correction and aperture compensation, and then led into a division circuit in which the former signal is divided with the latter. The output current is impressed on the Y-axis of an oscilloscope. The X-axis of the oscilloscope is deflected by a deflection circuit in synchronous relation to the photoelectric transducer, and the transmittance is indicated on the oscilloscope.

As explained hereinbefore, a photoelectric transducer of the present invention, the operation of which is solely electronic, enables us to provide a spectroscopic photometer which gives a spectrum within a very short time. Further, the said photoelectric transducer using a fan electron beam allows us to have simultaneously the electric signal corresponding to radiation passing through the sample cell and that corresponding to radiation passing through the reference cell. This means that there is no need to provide a unit for coinciding the electric signal from the sample cell with that from the reference cell, as in known spectrophotometers, with the result that calculation of division becomes easy and errors in wave length and transmittance are correspondingly alleviated. In the known method using a spot beam, there is extremely poor reproducibility due to the apparent change in charging period for a photoconductive layer unless every sweep is made over a determined portion even if a sweep rate is kept constant. In such known method, furthermore, it is unavoidable to suffer from poor sensitivity as the result of inadequate utilization of the incident radiation. In accordance with the present invention, in which a fan electron beam having a slit-shape spot is used for sweeping, it is possible to have a sufficiently large area of a photoelectric transducer swept and a sufficiently long spot as compared with the images formed on the photoconductive layer of the photoelectric transducer. Therefore, the charge period remains unchanged even when the spot is variably positioned. In addition, there is no loss in sensitivity because the entire image area is swept.

Still another advantage of this invention is that a transducer in accordance therewith is also applicable to a monochromatic ssytem which is used to obtain emission spectra. In this case, as will be apparent to those skilled in the art, a photoelectric transducer of the invention should have a single signal plate.

In the event the incident radiation is of weak intensity, sweeping at a low speed has been proposed to improve the signal-to-noise ratio. If this is done with a device using spot beam such device will be complicated because of the necessity of providing for synchronized sweeping in both the longitudinal and lateral directions. In contrast to this, the photoelectric transducer according to the present invention which requires only deflection in the lateral direction of the fan electron beam is adapted for the low speed sweeping.

What we claim is:

1. A photoelectric transducer adapted for use in a spectroscopic photometer, which comprises a vacuum envelope having a window to receive radiations from an external source, two signal plates of optically transparent electro-conductive material disposed side-by-side within said envelope and facing said window, layers of photoconductive material superposed on the surfaces of said signal plates which face away from said window, electron beam-generating means also disposed in said envelope at the side of said signal plates having said layers of photoconductive material thereon and generating a fan-shaped electron beam of slit-like cross-section which impinges simultaneously on both of said layers substantially across one dimension of the area of each of said layers, and means operative to deflect said electron beam in directions at right angles to the longitudinal axis of said slit-like cross-section, thereby to cause said beam to simultaneously sweep substantially the entire areas of both of said layers.

2. A photoelectric transducer adapted for use in a spectroscopic photometer, which comprises a vacuum envelope having a window to receive radiations from an external source, two signal plates of optically transparent electro-conductive material disposed within said envelope and facing said window, layers of photoconductive material superposed on the surfaces of said signal plates which face away from said window, electron beam-generating and scanning means also disposed in said envelope at the side of said signal plates having said layers of photoconductive material thereon for scanning said layers simultaneously each with a fan-shaped electron beam of slit-like cross-section which extends substantially across one dimension of the area thereof and including means operative to deflect said electron beam in directions at right angles to the longitudinal axis of said slit-like cross-section thereby to cause the substantially simultaneous sweeping of the entire areas of said layers.

References Cited

UNITED STATES PATENTS

| | | | |
|---|---|---|---|
| 2,357,922 | 9/1944 | Ziebolz et al. | 313—65 X |
| 2,717,972 | 9/1955 | Adler | 313—72 |
| 2,803,779 | 8/1957 | Rittner et al. | 313—65 X |
| 2,886,739 | 5/1959 | Matthews et al. | 313—65 X |
| 3,020,432 | 2/1962 | Nicholson | 313—65 X |

DAVID J. GALVIN, *Primary Examiner.*

JAMES W. LAWRENCE, ROBERT SEGAL,
*Examiners.*